United States Patent

Bussey, III et al.

[11] Patent Number: 5,849,394
[45] Date of Patent: Dec. 15, 1998

[54] SELF STICKING PACKAGING WRAP

[75] Inventors: Harry Bussey, III, Atlantic Highlands, N.J.; Harry Bussey, Jr., Marco Island, Fla.

[73] Assignee: CPI Packaging, Inc., Marlboro, N.J.

[21] Appl. No.: 663,454

[22] Filed: Jun. 13, 1996

[51] Int. Cl.⁶ .................................................. B32B 3/12
[52] U.S. Cl. .......................... 428/178; 428/166; 428/172
[58] Field of Search ................................. 428/178, 166, 428/172, 409; 206/522, 814, 524.1

[56] References Cited

U.S. PATENT DOCUMENTS

| | | |
|---|---|---|
| 3,904,465 | 9/1975 | Haase et al. .............................. 428/178 |
| 4,657,982 | 4/1987 | Breck et al. .............................. 525/240 |
| 4,783,366 | 11/1988 | Shimogo et al. ......................... 428/327 |
| 4,894,265 | 1/1990 | Chang et al. ............................. 428/178 |
| 5,093,188 | 3/1992 | Dohrer ...................................... 428/215 |
| 5,175,049 | 12/1992 | Huff et al. ................................ 428/218 |
| 5,569,693 | 10/1996 | Doshi et al. .............................. 428/516 |

*Primary Examiner*—Donald Loney
*Attorney, Agent, or Firm*—McAulay Nissen Goldberg Kiel & Hand, LLP

[57] ABSTRACT

A laminated bubble wrap packaging material is provided with has a tackifier, such as a polybutene, dispersed homogeneously throughout the packaging material. The packaging material is adherent to itself as well as and does not leave a residue. The tackifier is incorporated into the plastic material during extruding of the layers of plastic material into thin plastic films.

9 Claims, 1 Drawing Sheet

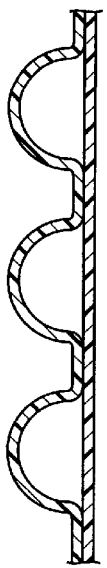
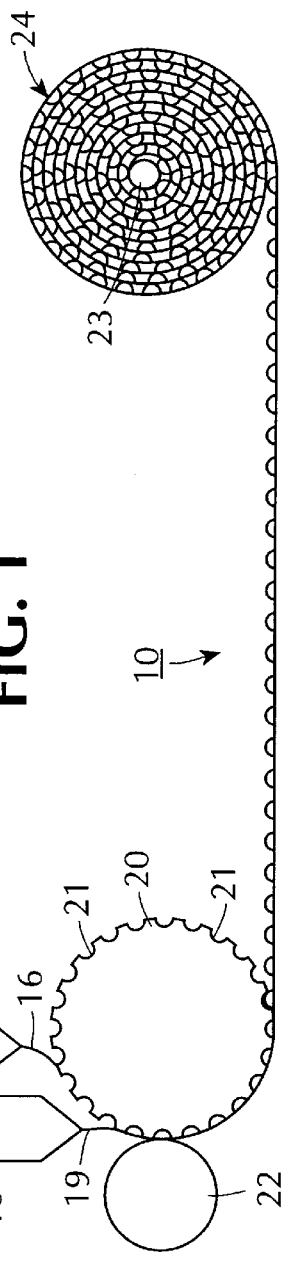
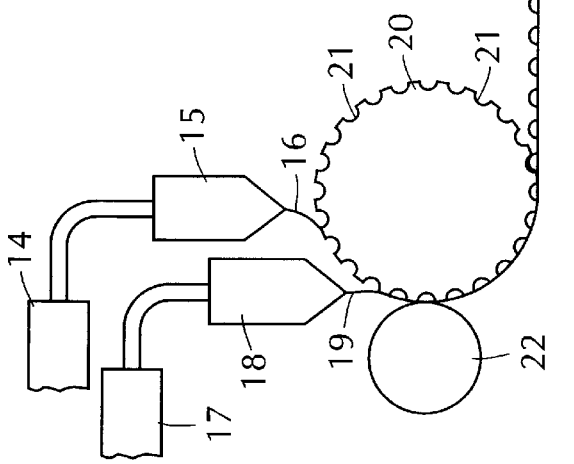
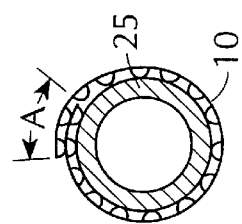
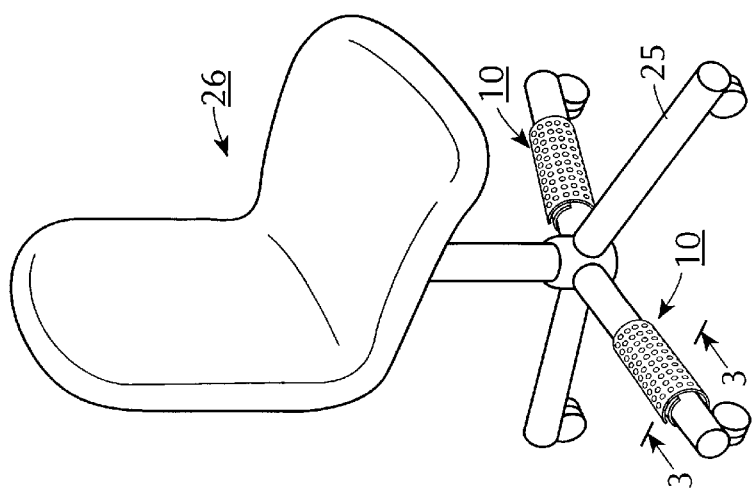

SELF STICKING PACKAGING WRAP

This invention relates to a self sticking packaging wrap. More particularly, this invention relates to a laminated packaging material having co-adhesive characteristics.

As is known, various types of plastic packaging materials have been known for the wrapping of items for packaging and/or shipping purposes. For example, one type of packaging material which has been frequently used is known as "bubble wrap". Such a packaging material is a laminated plastic material normally formed of a single flat layer of a plastic, such as polyethylene, and a second layer of like plastic material having pockets or recesses formed therein. Upon lamination of the two layers together, the pockets become sealed with air.

Typically, the above type of bubble-wrap packaging material has been supplied in various lengths and widths to package items. For example, it has been known to package gift items such as statues, porcelains and the like by wrapping the item with several convolutions of the wrapping material. Thereafter, the wrapped product is deposited into a suitable box or carton along with other packaging material for shipment purposes. It has also been know to use the bubble-wrap type of packaging material in sheet form by simply wrapping an article, such as a desk, by simply enveloping the item in one convolution for commercial moving purposes. In some cases, a sheet of the bubble wrap is simply laid over the top surface of an item such as a desk or a buffet for commercial moving purposes.

Typically, when bubble-wrap is used, there is a need to secure the wrap in place about or on the item to prevent the bubble wrap from simply falling away from the item to be protected. Generally, strips of tape are applied over the free end of the bubble wrap to secure the free end to the overlapped bubble wrap.

Other types of packaging materials are also known, for example foamed sheets which can be wrapped about an item and secured in place in an overlapped manner, for example by strips of adhesive tape and the like.

It has also been known to provide a sheet of bubble wrap or foamed material with an adhesive coating on one or both sides so that the bubble wrap or foam sheet will be able to adhere to itself when overlapped. However, this requires a relatively expensive manufacturing process. For example, independent steps are required to apply the adhesive coating to the bubble wrap or foamed sheet thereby making the manufacturing process more difficult. Still further, it is difficult to use such a material. For example, where the adhesive coating is applied to only one side, the wrapping material must be placed about the item to be wrapped, for example a chair leg, in a manner so that two ends of the sheet are free to stick to each other rather than to the item. In such a case, the wrapping may slide off the leg or other item which is to be packaged. In situations where the adhesive layer is applied to two opposite sides of the packaging material, the material must be wrapped more than once about the item to be packaged.

Accordingly, it is an object of the invention to provide a packaging material which can be readily wrapped about an item to be packaged and retained in place.

It is another object of the invention to provide a packaging material which does not require the use of other materials such as adhesive tapes in order to be secured about a wrapped item.

It is another object of the invention to provide a packaging material which is able to co-adhere to a packaged item without leaving a residue.

It is another object of the invention to provide a laminated packaging material having co-adhesive characteristics which can be made in a relatively inexpensive manner and which can be easily used.

Briefly, the invention provides a laminated packaging material which is comprised of a first thin flexible layer of plastic material having a plurality of spaced apart recesses in one surface and at least a second thin flexible layer of plastic material bonded to the one surface of the first layer to seal air into the recesses. In accordance with the invention, the laminated packaging material has a tackifier dispersed in at least one of the layers of plastic material in order to impart a co-adhesive characteristic to the one layer sufficient to permit this layer to co-adhere to itself and to be wrapped about a foreign object or laid over a foreign object without leaving a residue.

Typically, the packaging material employs polyethylene as the plastic material for example, a linear low density polyethylene, a low density polyethylene and/or a high density polyethylene. However, other suitable plastics may also be used, such as polypropylene.

The tackifier which is used may be dispersed in either or both of the layers of the laminated packaging material. In either case, the tackifier is homogeneously dispersed in the layer. The tackifier is made of a polybutene.

The invention also provides a method of making a co-adhesive packaging material. To this end, the method includes the steps of mixing a charge of a thermoplastic such as polyethylene, and a tackifier together to form a homogeneous extrudable mass and of extruding this mass into a first stream of thin plastic film.

In accordance with the invention, a second stream of thin plastic film is also generated and a plurality of spaced apart recesses are formed in one surface of at least one of the two streams of plastic film. Thereafter, the two streams are laminated together in order to seal the air within the recesses and to form a continuous web of laminated packaging material which is characterized in being co-adherent to itself and in being wrapped about an item to be packaged or laid over a surface to be protected without leaving a residue.

In accordance with the method, the tackifier constitutes from 8 percent to 20 percent by weight of the plastic material and preferably from 8 percent to 10 percent. In this respect, the amount of tackifier which is added should be in an amount sufficient to render the plastic material co-adherent to itself while being applied over a surface of an item to be packaged or wrapped without leaving a residue.

By mixing the tackifier with the plastic material before and during extrusion, the tackifier is dispersed in a homogeneous manner through the plastic mass. As a result, the tackifier is exposed on all surfaces of the finished laminated packaging material and allows the packaging material to be used with ease. As a result, the packaging material eliminates the need for any tying, tape, wedging and other techniques previously employed to secure a packaging material to or about a packaged item.

These and other objects and advantages of the invention will become more apparent from the following detailed description taken in conjunction with the accompanying drawings wherein:

FIG. 1 illustrates a schematic view of an apparatus employed in a method of making a co-adhesive packaging material in accordance with the invention;

FIG. 2 illustrates a perspective view of an office-type chair having legs wrapped with a packaging material in accordance with the invention;

FIG. 3 illustrates a view taken on line 3—3 of FIG. 2; and

FIG. 4 illustrates a cross-sectional view through a bubble-wrap packaging material employed in FIG. 2.

Referring to FIG. 4, the laminated packaging material 10 is comprised of a first thin flexible layer 11 of plastic material selected from the group consisting of polyethylene and polypropylene having a plurality of spaced apart recesses 12, for example of hemispherical shape in one surface thereof. In addition, the packaging material 10 includes a second thin flexible layer 13 of plastic material of the same type as the first layer 11 which is bonded to the surface of the first layer 11 in order to seal air into the recesses 12. The laminated structure is of conventional structure for a bubble-wrap type of packaging material. For example, each layer 11, 13 has a thickness of from 0.005 to 0.010 inches.

The recesses 12 serve to define hemispherical pockets of air which are particularly suitable for packaging purposes. The pockets may, of course, be other than hemispherical. Further, where desired, both layers 11, 13 may be provided with recesses to provide bubbles of air on both sides of the packaging material.

In accordance with the invention, a tackifier is dispersed in at least one of the layers 11, 13 in order to impart a co-adhesive characteristic to that layer sufficient to permit that layer to co-adhere to itself and to be laid over an item to be wrapped or covered without leaving a residue.

Referring to FIG. 1, in order to make the co-adhesive packaging material 10, a charge of thermoplastic material such as a polyethylene plastic, and a tackifier are mixed together to form a homogeneous extrudable mass. For example, the polyethylene plastic may be delivered in pellet form into a mixing zone of an extruder 14. The tackifier may also be supplied in pellet form with the plastic or through a suitable inlet to the extruder 14 at a point downstream of the point where the plastic is introduced into the extruder 14. By way of example, one run for making the packaging material 10 employed 20 pounds of polyethylene and 2 pounds of the tackifier. A mixture was obtained and extruded at a rate of 360 to 400 pounds per hour with the homogenous mass being heated in various stages from 190° C. up to conventional ranges of 310° C. prior to extruding.

The extruder 14 is of a conventional construction so as to provide for mixing of the various ingredients in order to form an extrudable homogeneous mass. The extruder 14 also has a suitable outlet which communicates with a die 15 so as to extrude the mass into a stream of thin plastic film 16. In this respect, the film 16 may be extruded in a web of a width which is conventional for a bubble-wrap packaging material.

In addition, a second extruder 17 of like structure serves to extrude an extrudable homogeneous mass of plastic through a die 18 into a stream of thin plastic film 19 in a similar manner. To this end, the second stream of film 19 may include a tackifier or not but is preferable.

As illustrated, the first stream of plastic film 16 is directed onto a forming roller 20 having a plurality of circumferentially disposed recesses 21 therein. Each recess 21 is made of hemispherical shape but may also be of any other suitable shape. The forming roller 20 is of conventional structure for forming pockets 12 in the first generated film 16. Typically, the pockets 21 are formed by a vacuum force which is pulled within the recesses 21 of the roller 20 upstream of the point at which the second film 19 is applied to the forming roller 20. A pressure roller 22 is also provided adjacent to the forming roller 20 for pressing the two films 16, 19 together so as to bond the two films 16, 19 together thereby forming the laminated packaging material 10.

A suitable wind-up shaft 23 is provided downstream of the pressure roller 22 and forming roller 20 in order to wind up the laminated packaging material 10 into a roll 24.

The width of the packaging material 10 may be of any suitable width. Further, the packaging material 10 may be severed longitudinally to form smaller widths. The packaging material may be provided in various lengths depending upon the uses desired.

One advantage of the packaging material 10 is that when a finished roll 24 has been formed, the free end of the packaging material 10 does not require a separate taping or other securing means to be held in place. Instead, it is sufficient for the free end of the packaging material to be co-adhered to the underlying convolution of the packaging material.

Another advantage of the packaging material is that there is no telescoping of the convolutions of the packaging material when in roll form. Thus, the packaging material 10 may be wound up into rolls of relatively narrow widths without any telescoping effect occurring within a roll.

Referring to FIG. 2, individual strips of the packaging material 10 may be wrapped about the legs 25 of a chair 26, such as an office type chair, for transportation purposes. In this regard, as indicated in FIG. 3, a length of the packaging material 10 may be wrapped completely about a leg 25 of the chair with an overlap A of the ends of approximately 4 to 5 inches. Alternatively, the packaging material 10 may be wrapped to form two or more convolutions about the chair leg 25 depending upon the amount of cushioning desired. The actual amount of overlap A should be sufficient to permit the free end of the packaging material 10 to adhere to the inner convolution of the packaging material 10 while the packaging material 10 itself is firmly held about the chair leg 25.

By way of example, the plastic material which is used for the packaging material may be a conventional polyethylene such as a LLDPE, a LDPE (low density polyethylene) or HDPE (high density polyethylene).

The tackifier which is used with the above plastic is a polybutene, such as TPM 1937 manufactured by Techmer PM.

The tackifier is introduced into the plastic material so as to constitute from 5% to 20% and preferably from 8% to 10% by weight of the weight of the polyethylene.

The packaging material that is manufactured is characterized in being co-adherent to itself while being able to contact all surfaces without leaving a residue which would otherwise mar any surface. The tackifier in the packaging material provides enough adhesive characteristics for the packaging material to adhere to itself.

The packaging material may be wrapped about an item to be packaged or shipped, for example in the manner described above with respect to the leg of a chair. In addition, the packaging material may be laid over a surface such as a flat horizontal top of a desk without leaving any residue.

One characteristic of the packaging material is that the material is able to stay in place. In this respect, there is sufficient cling of the packaging material to the desk surface to resist any slipping, sliding or shifting of the packaging material relative to the desktop.

The packaging material may also be placed over larger surfaces such as doors and table tops which are to be transported from place to place. In such cases, the packaging material is laid over the surface of the item, for example a table top, with ends which drape over the sides of the table top. By folding the draped sections of the material over on itself at the corners of the table top, the material will co-adhere to itself and remain in place during transportation of the table top from place to place, for example with the table top being turned into a vertical disposition.

The invention thus provides a packaging material which is able to remain in place when wrapped about or applied to an item and, thus, reduces the time required to package or cover an item.

The described process reduces costs in producing a co-adhesive packaging material dramatically with respect to those techniques in which a cohesive coating is applied to a plastic laminate. In particular, the described process provides a co-adherent surface on both sides of the packaging material thereby eliminating any need to apply two separate cohesive coatings to a packaging laminate.

What is claimed is:

1. A laminated packaging material comprising a first thin flexible layer of plastic material having a plurality of spaced apart recesses in one surface thereof;

a second thin flexible layer of plastic material bonded to said one surface of said first layer to seal air into said recesses; and a tackifier dispersed in at least one of said layers to impart a co-adhesive characteristic to said one layer sufficient to permit said one layer to selectively co-adhere to itself without leaving a residue.

2. A laminated packaging material as set forth in claim 1 wherein each said layer is made of polyethylene.

3. A laminated packaging material as set forth in claim 1 wherein said tackifier is dispersed in each said layer.

4. A laminated packaging material as set forth in claim 1 wherein said tackifier is homogeneously dispersed in each said layer.

5. A laminated packaging material as set forth in claim 4 wherein said tackifier constitutes from 5% to 20% by weight of the weight of said plastic material in a respective layer.

6. A laminated packaging material as set forth in claim 5 wherein said tackifier constitutes from 8% to 15% by weight of the weight of said plastic in a respective layer.

7. A laminated packaging material as set forth in claim 1 wherein each layer has a thickness of from 0.005 to 0.010 inches.

8. A laminated packaging material as set forth in claim 1 wherein said tackifier is a polybutene.

9. A laminated packaging material as set forth in claim 1 wherein said plastic material is selected from the group consisting of linear low density polyethylene, low density polyethylene, high density polyethylene and polypropylene.

* * * * *